(12) United States Patent
Kim et al.

(10) Patent No.: US 11,919,198 B2
(45) Date of Patent: Mar. 5, 2024

(54) APPARATUS FOR PUNCHING ANCHOR BOLT INSERTION HOLE

(71) Applicant: DAE-DONG STONE ENG. CO., LTD, Pocheon-si (KR)

(72) Inventors: Cheol Hyun Kim, Seoul (KR); Dong Oun Jun, Uijeongbu-si (KR)

(73) Assignee: DAE-DONG STONE ENG. CO., LTD, Pocheon-si (KR)

( * ) Notice: Subject to any disclaimer, the term of this patent is extended or adjusted under 35 U.S.C. 154(b) by 210 days.

(21) Appl. No.: 17/457,223

(22) Filed: Dec. 1, 2021

(65) Prior Publication Data

US 2022/0088828 A1 Mar. 24, 2022

Related U.S. Application Data

(63) Continuation of application No. PCT/KR2020/017910, filed on Dec. 9, 2020.

(30) Foreign Application Priority Data

Mar. 4, 2020 (KR) .................. 10-2020-0026968

(51) Int. Cl.
*B21D 1/14* (2006.01)
*B23B 45/00* (2006.01)
(Continued)

(52) U.S. Cl.
CPC ............ *B28D 1/146* (2013.01); *B23B 45/005* (2013.01); *B23B 47/287* (2013.01)

(58) Field of Classification Search
CPC ...... B28D 1/146; B23B 45/005; B23B 47/287
(Continued)

(56) References Cited

U.S. PATENT DOCUMENTS 3,191,390 A * 6/1965 Schutte ................ E02D 5/38
405/238
4,502,554 A * 3/1985 Jones .................. E21B 10/32
175/285
(Continued)

FOREIGN PATENT DOCUMENTS

EP 0094070 B1 8/1985
JP 2001-353714 A 12/2001
(Continued)

OTHER PUBLICATIONS

International Search Report in PCT Application No. PCT/KR2020/017910 dated Jun. 15, 2021 in 5 pages.

*Primary Examiner* — Taras P Bemko
(74) *Attorney, Agent, or Firm* — Knobbe, Martens, Olson & Bear, LLP

(57) ABSTRACT

An apparatus for punching an anchor bolt insertion hole is disclosed. The apparatus enables punching work for forming the anchor bolt insertion hole, of which the bottom side is wider than an inlet, on a panel surface for constructing a concrete structure to be performed regardless of the skill of a worker. During operation, the apparatus provides the movement direction of a hammer drill into the vertical direction and the inclination direction so as to enable precise punching work, and doubly arranges springs, which are elastic devices for adjusting the movement range of the hammer drill, so as to uniformly maintain the angle and size for cutting a wall such that a cross-sectional diameter is large at a portion adjacent to the bottom of the anchor bolt insertion hole.

6 Claims, 8 Drawing Sheets

(51) Int. Cl.
*B23B 47/28* (2006.01)
*B28D 1/14* (2006.01)

(58) Field of Classification Search
USPC .......................................................... 175/40
See application file for complete search history.

(56) References Cited

U.S. PATENT DOCUMENTS

| | | | | |
|---|---|---|---|---|
| 4,992,010 | A | * | 2/1991 | Fischer ............... B23B 51/0045 175/286 |
| 11,213,898 | B2 | * | 1/2022 | Miyanaga ........... B23B 51/0018 |
| 2011/0180330 | A1 | * | 7/2011 | Conn ....................... E21B 10/32 175/406 |
| 2012/0145459 | A1 | | 6/2012 | Cousineau |
| 2019/0160707 | A1 | * | 5/2019 | Miyanaga ................. E21B 7/28 |

FOREIGN PATENT DOCUMENTS

| | | | |
|---|---|---|---|
| KR | 10-2010-0040600 | A | 4/2010 |
| KR | 10-1141414 | B1 | 5/2012 |
| KR | 10-2015-0138318 | A | 12/2015 |

\* cited by examiner (a)  (b)

(a)

(b)

(a)

(b)

APPARATUS FOR PUNCHING ANCHOR BOLT INSERTION HOLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to an apparatus for punching anchor bolt insertion hole.

BACKGROUND ART

In a building built with a concrete frame, architectural exterior materials are added to the concrete exterior walls to finish or decorate the walls. As exterior materials, stone materials and ceramic panels are mainly used and ceramic panel is a kind of artificial marble made by crushing granite or marble and mixing cement, paint and pigment to harden it. In order to install such an exterior material, it may be necessary to fix the anchor bolt in an exposed form to the panel installed on the concrete exterior wall.

Korean Patent No. 10-1141414 discloses the related technology. The disclosure of this section is to provide background information relating to the present disclosure. Applicant does not admit that any information contained in this section constitutes prior art.

SUMMARY

One aspect of the present disclosure is to provide an apparatus for punching anchor bolt insertion hole in which the hammer drill fixing portion and the adapter structure are improved so that the hammer drill of the punching apparatus can be inclined at a predetermined angle within a predetermined range.

Another aspect of the present disclosure is to provide an apparatus for punching anchor bolt insertion hole to make a hole for an anchor bolt insertion hole with a bottom side wider than an entrance on a panel surface for installing a concrete structure, regardless of the skill level of the operator.

The present disclosure provides an apparatus for punching anchor bolt insertion hole, the punching apparatus comprising: a hammer drill attached exposing a drill bit; and a hammer drill adapter connected to the hammer drill so that the exposed drill bit passes through the lower portion of the hammer drill and so that the drill bit is movable in a vertical direction and in an inclined direction in a predetermined space, the hammer drill adapter comprising: a first body forming an upper and lower two-stage cylindrical body, the upper cylindrical body having a fixing bolt on its side surface fastened to a fixing hole of the hammer drill, the lower cylindrical body having female screw thread on its inner surface, the diameter of the lower cylindrical body is smaller than the upper cylindrical body; a cylinder shaped drill bit fixing portion having a male screw thread on the upper outer surface so as to be screwed with the female screw thread of the first body, an intermediate protrusion on the outer surface spaced a portion from the male screw thread by a predetermined length; an inclined driving portion having a spherical upper surface with an annular protrusion formed in the center, a vertical walled side surface with the same radius in cross section, and a detachable circular plane lower surface in contact with the bottom of the vertical walled side surface, and a through hole is formed in the inner space of the inclined driving portion created by the upper surface, the side surface and the lower surface so that the intermediate protrusion of the drill bit fixing portion is located, and a first spring elastically supporting the intermediate protrusion of the drill bit fixing portion is located on the upper surface of the circular plane forming the lower surface toward the inner space, a descending hanging portion of the intermediate protrusion of the drill bit fixing portion enclosing the spring is formed in a lower height than the first spring; and a second body comprising a cover portion comprising an upper inner surface having a radius of curvature equal to or larger than that of the spherical surface of the inclined driving portion upper surface and an opening of a predetermined size so that the upper surface of the inclined driving portion is stopped, a side inner surface having cylindrical wall so that the inclined driving portion is movable in the vertical direction, and a cylindrical wall bottom portion having been extended to a predetermined size so as to have a radius of curvature equal to or greater than the spherical surface of the inclined drive portion upper surface; a cylindrical supporting portion having an inclined cylindrical space coupled to the cover portion, an inner ring-shaped support portion is formed inside the inclined cylindrical space, a second spring is disposed on the inner ring-shaped support portion to elastically support the inclined driving portion, the inclined driving portion is located in the inclined cylindrical space between the cover portion and the inner ring-shaped support portion; and a lower surface assembly portion having an inclined driving portion support cylinder and an inclined bearing, the inclined driving portion support cylinder is located inside the inner ring-shaped support portion and stopping the lower surface of the inclined driving portion at a predetermined point while making the drill bit pass through itself, the inclined bearing maintaining the center of the drill bit fixing portion to the cylindrical support portion when the inclined driving portion support cylinder moves in an up and down direction and an inclined direction, wherein the spring constant of the first spring is greater than the spring constant of the second spring so that the first spring is not compressed while the second spring is elastically compressed.

In the foregoing apparatus, a flat rubber ring covering end protrusion of the inner ring-shaped support to prevent dust from entering the space between the inner ring-shaped support and the drill bit fixing portion and a third spring applying pressure to the flat rubber ring when the lower surface of the inclined driving portion moves up and down are located in the inclined movement space of the second body.

In the foregoing apparatus, the upper cylindrical portion of the first body forms a plurality of outlets for discharging dust from the cylindrical space to the outside.

In the foregoing apparatus, the cylindrical support portion of the second body forms a plurality of outlets for discharging dust to the outside in the inclined movement space.

In the foregoing apparatus, each fixing key groove is formed at the female screw thread and at the male screw thread so the female screw thread of the first body and the fixing key pin passing through the male screw thread of the drill bit fixing portion to be combined, when the female screw thread of the first body is screwed with the male screw thread of the drill bit fixing portion, and a ring-shaped groove is formed on the outer peripheral surface of the female screw thread so that a rubber ring surrounding the fixing key can be inserted.

In the foregoing apparatus, the cylindrical support portion of the second body having a groove along an arc in the range of 80 degrees to 100 degrees for inserting the blade of a right angle ruler for measuring a right angle to the outer cylindrical rim adjacent to the bottom surface, and having a groove width into which an elastic ring including a spring can be inserted in the remaining portion of the rim.

The apparatus for punching anchor bolt insertion hole according to aspects of the present disclosure separates the motion direction of the hammer drill into vertical and inclined directions during work so that the punching operation to be performed precisely, and also by double arrangement of springs which are elastic portions for adjusting the movement range of the hammer drill, in order to increase the cross-sectional diameter in the portion adjacent to the bottom of the anchor bolt insertion hole, so that cutting angle and size of wall to be maintained uniformly.

DETAILED DESCRIPTION OF EMBODIMENTS

Figure 1:
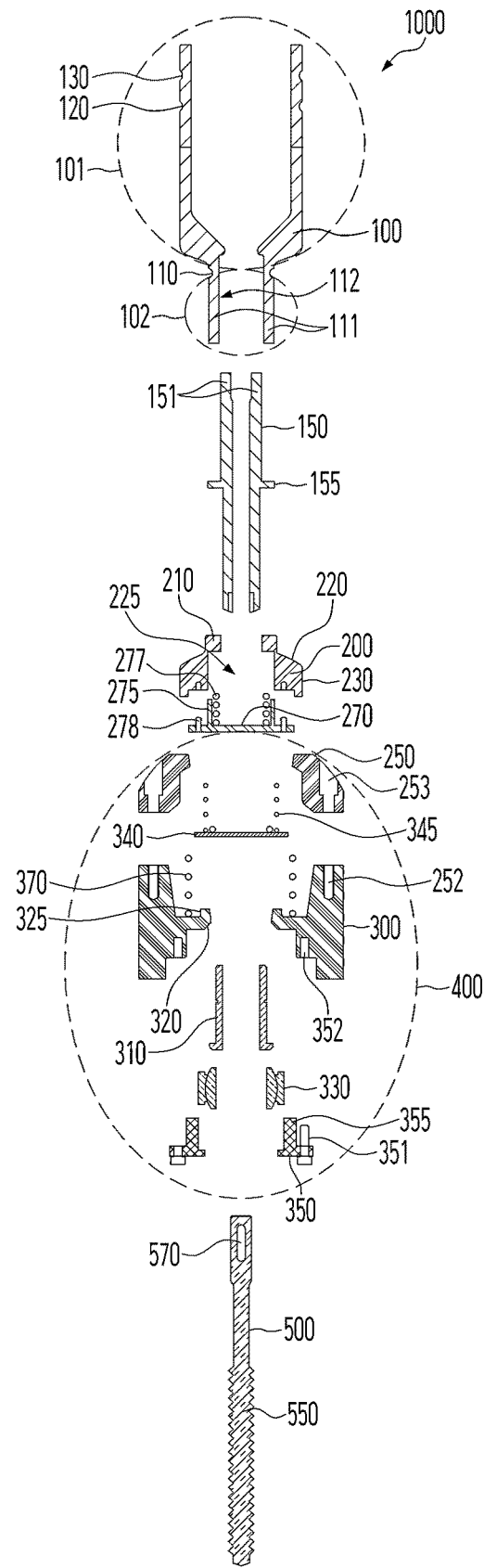
FIG. 1 is an exploded cross-sectional view of an apparatus for punching anchor bolt insertion hole, according to an embodiment of the present disclosure.

Prior to the detailed description of the present disclosure, terms or words used in the present specification and claims described below should not be construed as being limited to ordinary or dictionary meaning. Therefore, embodiments described in the present specification and the configurations illustrated in the drawings are merely examples and are not intended to represent all of the technical spirit of the present disclosure, such that it should be understood that various equivalents and deformed examples capable of replacing these at the time of filing the present disclosure can be present.

In one example of fixing an anchor bolt, in order to fix the anchor bolt to the panel, an anchor bolt insertion hole with a bottom diameter greater than the entrance is drilled in the panel, and an anchor bolt whose head diameter increases toward the end is inserted into the anchor bolt insertion hole. After that a sleeve located in the portion of short diameter of anchor bolt head is moved toward the end of the head, and the sleeve is brought into contact with the inner wall of the anchor bolt insertion hole. By the contact of the sleeve, the anchor bolt is firmly fixed to the anchor bolt insertion hole.

The anchor bolt is composed of a screw portion and a head portion, and the head portion is inclined so that the diameter of the cross section increases in the end direction from the screw portion. The anchor bolt sleeve is to be fixed by being pushed into the space between the anchor bolt and the hole while expanding along the inclined surface of the head through an external force such as a blow while the anchor bolt is inserted into the hole. In order to fix the sleeve moving along the slope of the head of the anchor bolt whose diameter increases as described above, an anchor bolt insertion hole having a larger cross-sectional diameter at the portion adjacent to the bottom than the inlet may be formed.

In order to make a hole of such a shape, one example provides an adapter for performing vertical and partial rotational movements while a perforated drill bit fixed to a hammer drill passes there through, so that perforation can be performed manually. However, since the worker tilts the hammer drill at an arbitrary angle around the elastic support unit of the adapter fixing the perforated device during perforation at a perforated position, the angle and size of the wall are different for each worker to increase the cross-sectional diameter at the bottom of the anchor bolt insertion hole.

Figure 2:
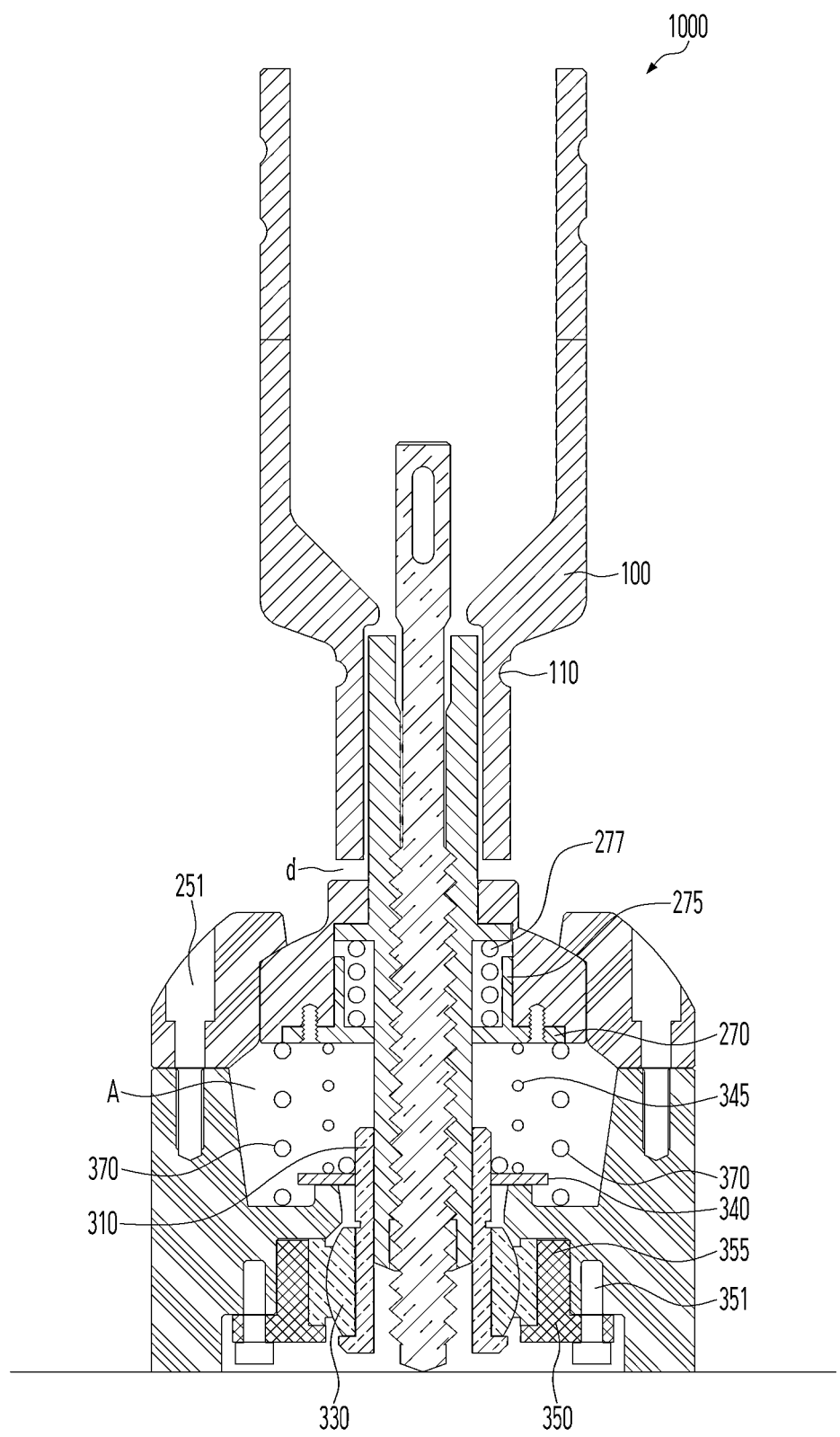
FIG. 2 is a combined cross-sectional view of the apparatus for punching anchor bolt insertion hole, according to an embodiment of the present disclosure.

Embodiments of the present disclosure are further discussed in detail below with reference to the accompanying drawings so that those skilled in the art to which the present disclosure pertains can easily practice them. FIG. 1 is an exploded cross-sectional view of an apparatus for punching anchor bolt insertion hole according to an embodiment of the present disclosure, and FIG. 2 is a combined cross-sectional view of the apparatus for punching anchor bolt insertion hole according to an embodiment of the present disclosure.

In an embodiment of the present disclosure, an apparatus for punching anchor bolt insertion hole includes a hammer drill attached exposing a drill bit 500; and a hammer drill adapter 1,000 connected to the hammer drill so that the exposed drill bit passes through the lower portion of the hammer drill and so that the drill bit is movable in a vertical direction and an inclined direction in a predetermined space. In an embodiment of the present disclosure, the hammer drill may be used as long as the end 550 of the drill bit 500 is exposed to perforate stone. The drill bit 500 to which the end 550 is exposed is fixed to a mechanical or electric hammer drill through a fixing hole 570, and in an embodiment of the present disclosure, the hammer drill uses an electric rotation drill.

In one embodiment of the present disclosure, the hammer drill adapter connected to the hammer drill includes a first body 100, a drill bit fixing portion 150, an inclined driving portion 200, and a second body. In an embodiment of the present disclosure, the first body forming an upper and lower two-stage cylindrical body is provided. The upper cylindrical body having a fixing bolt on its side surface fastened to a fixing hole of the hammer drill, the lower cylindrical body having female screw thread 111 on the inner surface, the diameter of the lower cylindrical body is smaller than the upper cylindrical body.

In one embodiment of the present disclosure, the drill bit fixing portion 150 is provided having a male screw thread 151 on the upper outer surface so as to be screwed with the female screw thread 111 of the first body, an intermediate protrusion 155 on the outer surface spaced apart from the male screw thread by a predetermined length, and may have a cylindrical shape for fixing the drill bit 500 penetrating the inside.

In one embodiment of the present disclosure, the drill bit fixing portion 150 for fixing the drill bit 500 is screwed with the first body 100 and passes through the inclined driving portion 200, and the first spring 277 of the inclined driving portion is elastically supported. The inclined driving portion 200 has a spherical upper surface 220 with an annular protrusion 210 formed in the center, a vertical walled side surface 230 with the same radius in cross section, and a detachable circular plane lower surface 270 in contact with the bottom of the vertical walled side surface 230, and a through-hole is formed in the inner space of the inclined driving portion 200 created by the upper surface, the side surface 230 and the lower surface 270 so that the intermediate protrusion 155 of the drill bit fixing portion is located, and a first spring 277 elastically supporting the intermediate protrusion of the drill bit fixing portion is located on the upper surface 220 of the circular plane forming the lower surface toward the inner space, a descending hanging portion 275 of the intermediate protrusion 155 of the drill bit fixing portion enclosing the spring is formed in a lower height than the first spring. The upper surface 220 and the side surface 230 of the inclined driving portion 200 are one body, and the side surface 230 and the lower surface 270 are fastened with a fastening member 278.

In one embodiment of the present disclosure, the inclined driving portion 200 may move along a trajectory constrained by the shape of the inclined driving portion inside the second body, and the second body includes a cover portion 250, a cylindrical support portion 300, and a lower surface assembly portion 350. A cover portion fastening hole 253 is formed in the cover portion 250, and a cylindrical support portion fastening hole 252 is formed on the upper portion of the cylindrical support portion 300 in contact with the cover portion fastening hole 253, so as to fasten the fastening hole 253 and the cylindrical support portion fastening hole 252 with the fastening member 251 to create a space in which the inclined driving portion 200 moves. In addition, a fastening hole 352 is formed in the lower portion of the cylindrical support portion 300, so that the fastening member 351 can be inserted and fixed through the fastening hole formed in the lower surface assembly portion 350. An inclined bearing fixing portion 355 for fixing the inclined bearing 330 is positioned on the upper surface of the lower surface assembly portion 350.

In one embodiment of the present disclosure, the cover portion 250 comprising the upper inner surface 258 having a radius of curvature equal to or larger than that of the spherical surface of the inclined driving portion upper surface 220 and opening of a predetermined size so that the inclined driving portion upper surface is stopped, a side inner surface 256 having cylindrical wall so that the inclined driving portion is movable in the vertical direction, and a cylindrical wall 259 bottom portion having been extended to a predetermined size so as to have a radius of curvature equal to or greater than the spherical surface of the inclined driving portion upper surface; a cylindrical supporting portion 300 having an inclined cylindrical space coupled to the cover portion 250 an inner ring-shaped support portion 320 is formed inside the inclined cylindrical space, a second spring 370 is disposed on the inner ring-shaped support portion 320 to elastically support the inclined driving portion, the inclined driving portion is located in the inclined cylindrical space (A) between the cover portion and the inner ring-shaped support portion 320; and a lower surface assembly portion 350 having an inclined bearing, the inclined driving portion support cylinder 310 is located inside the inner ring-shaped support portion 320 and stopping the lower surface 270 of the inclined driving portion at a predetermined point while making the drill bit pass through itself, the inclined bearing 330 maintaining the center of the drill bit fixing portion 150 to the cylindrical support portion 300 when the inclined driving portion support cylinder moves in an up and down direction and an inclined direction. In one embodiment of the present disclosure, the spring constant (modulus of elasticity) of the first spring 277 is a value greater than the spring constant of the second spring 370 so as not to be compressed during elastic compression of the second spring 370.

Figure 3:
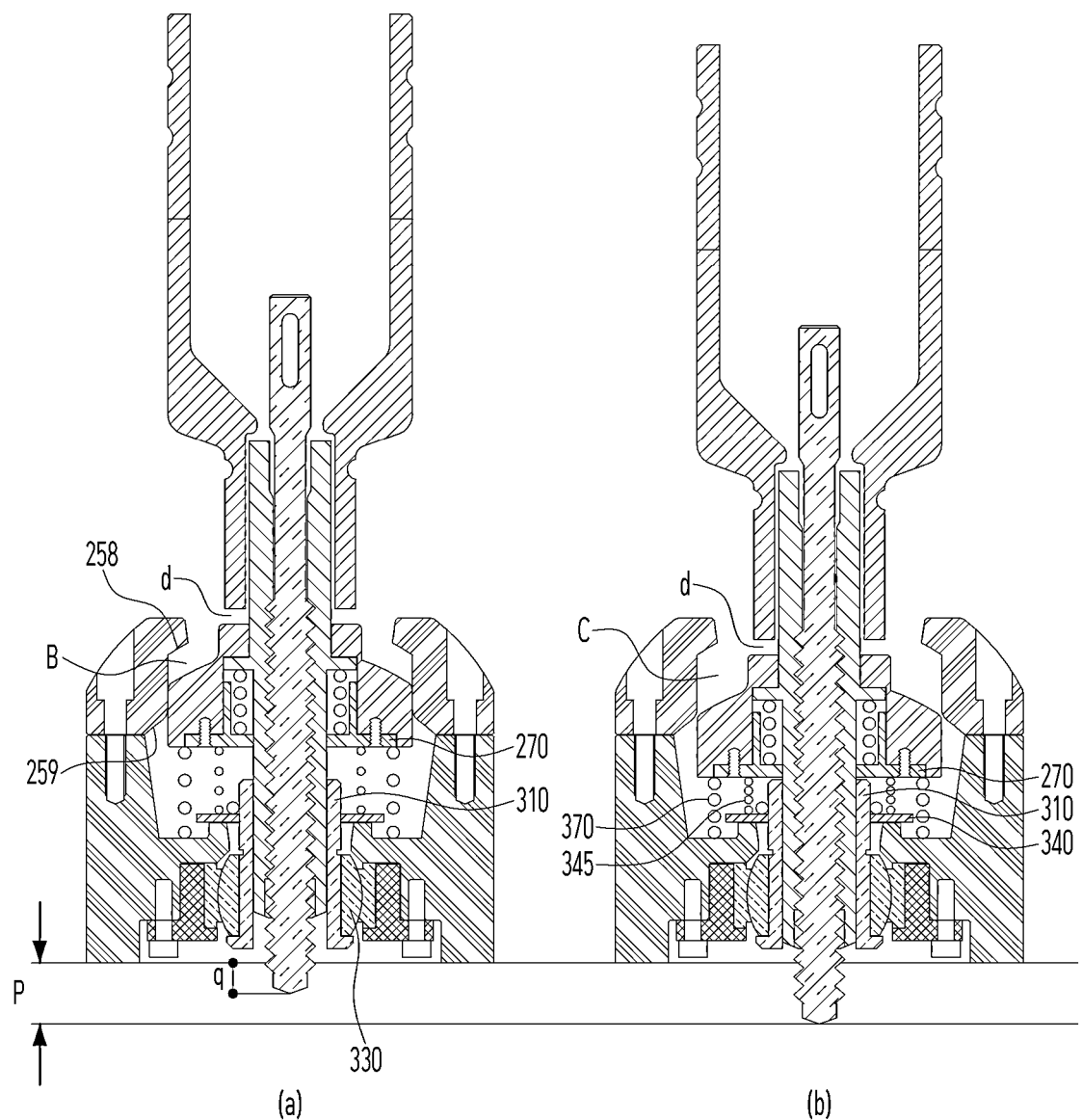
FIG. 3 is a cross-sectional view illustrating a shape in which the hammer drill adapter inclined driving portion of the apparatus for punching anchor bolt insertion hole moves in the vertical direction along the cylindrical wall surface of the cover portion inside the second body, according to an embodiment of the present disclosure.

FIG. 3 is a cross-sectional view illustrating a shape in which the hammer drill adapter inclined driving portion 200 of the apparatus for punching anchor bolt insertion hole moves in the vertical direction along the cylindrical wall surface (B, C space) of the cover portion 250 inside the second body, according to an embodiment of the present disclosure. In one embodiment of the present disclosure, since the side surface 230 is a vertical wall surface having the same radius, the inclined driving portion 200 moves in the vertical direction along the side inner surface 256 of the second body cover portion.

The inclined driving portion 200 can move upward to the point where the upper surface 220 of inclined driving portion contacts an upper inner surface of cover portion 250 having a radius of curvature equal to or larger than the spherical surface of the inclined driving portion upper surface 220 and having an opening of a predetermined size, and can move downward to a point in contact with the inclined driving portion support cylinder 310 of the second body that stops the inclined driving portion lower surface 270 at a predetermined point. During the downward movement, the second spring 370 is elastically compressed, and even when the second spring is compressed, the first spring 277 inside the inclined driving portion is not compressed such that the first spring constant (modulus of elasticity) of the second spring is larger than that of the first spring. Therefore, even in the case of the downward movement, the distance d between the first body and the inclined driving portion is maintained without being reduced.

In FIG. 3, (a) illustrates a state in which the lower surface 270 of the inclined driving portion does not contact the inclined driving portion support cylinder 310 in a state in which the downward movement proceeds for a length of q, while the inclined driving portion is spaced apart from the inner surface of the upper side of the second body cover portion by B. In FIG. 3, (b) is a state in which the lower surface 270 of the inclined driving portion is in contact with the inclined driving portion support cylinder 310 in a state in which the inclined driving portion has progressed by a length of p in the downward movement state, and cannot proceed any more, while the inclined driving part is spaced apart from the upper inner surface of the second body cover portion by C. In one embodiment of the present disclosure, the vertical depth of the anchor bolt insertion hole p length may be 15 mm. The vertical movement is possible by the operator applying a force during the operation.

In one embodiment of the present disclosure, a flat rubber ring 340 covering end protrusion 325 of the inner ring-shaped support to prevent dust from entering the space between the inner ring-shaped support portion 320 and the drill bit fixing portion 150 and a third spring 345 applying pressure to the flat rubber ring when the lower surface of the inclined driving portion moves up and down are located in the inclined movement space of the second body. The flat rubber ring 340 is in close contact with the upper surface of the inner ring-shaped support portion by the force of the third spring when the inclined driving portion moves downward to prevent the progress of dust. When the inclined driving portion moves upward, the third spring is relaxed, so that the dust that has already entered the space between the inner ring-shaped support portion 320 and the drill bit fixing portion 150 can be discharged into the inclined movement space. In one embodiment of the present disclosure, the cylindrical support portion 300 of the second body may form a plurality of outlets 390 for discharging dust from the inclined movement space to the outside, thereby removing the dust to the outside.

A plurality of outlets 190 for discharging dust to the outside may also be formed in the cylindrical space formed in the upper cylindrical portion of the first body 100. In addition, in one embodiment of the present disclosure, wherein each fixing key groove is formed at the female screw thread 111 and at the male screw thread 151 so the female screw thread of the first body and the fixing key pin passing through the male screw thread of the drill bit fixing portion to be combined, when the female screw thread of the first body is screwed with the male screw thread of the drill bit fixing portion, and a ring-shaped groove 110 is formed on the outer peripheral surface of the female screw thread so that a rubber ring surrounding the fixing key can be inserted.

Figure 4:
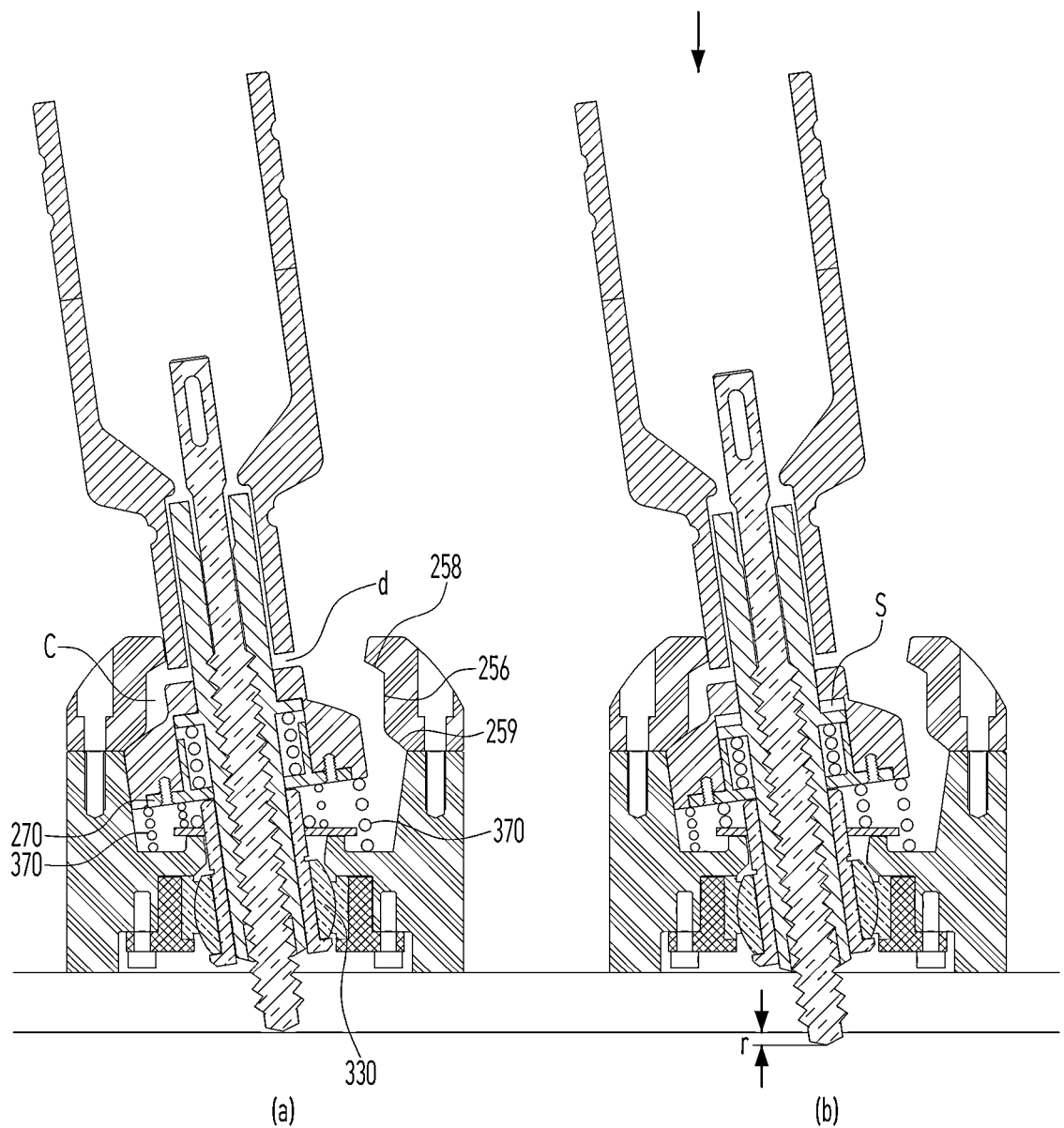
FIG. 4 is a cross-sectional view illustrating a shape in which the hammer drill adapter inclined driving portion of the apparatus for punching anchor bolt insertion hole moves in an inclined direction along the cover portion inclined movement space inside the second body, according to an embodiment of the present disclosure.
Figure 5:
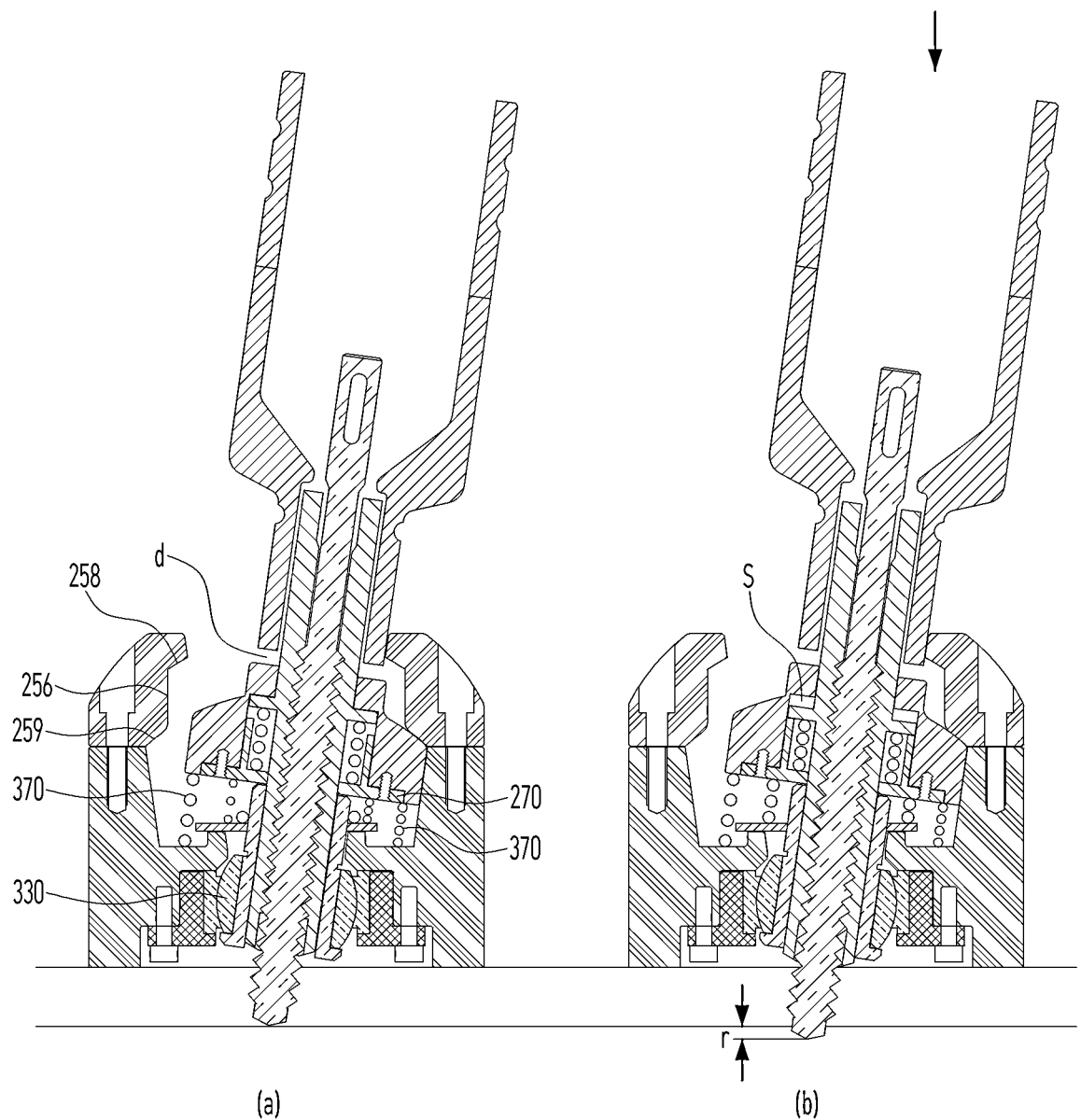
FIG. 5 is a cross-sectional view illustrating a shape in which the hammer drill adapter inclined driving portion of the apparatus for punching anchor bolt insertion hole moves in the other direction in the inclined direction along the cover portion inclined movement space inside the second body, according to an embodiment of the present disclosure.

FIG. 4 is a cross-sectional view illustrating a shape in which the hammer drill adapter inclined driving portion of the apparatus for punching anchor bolt insertion hole moves in an inclined direction along the cover portion inclined movement space inside the second body, according to an embodiment of the present disclosure. FIG. 5 is a cross-sectional view illustrating a shape in which the hammer drill adapter inclined driving portion of the apparatus for punching anchor bolt insertion hole moves in the other direction in the inclined direction along the cover portion inclined movement space inside the second body, according to an embodiment of the present disclosure. In one embodiment of the present disclosure, after the upper surface 220 of the inclined driving portion moves downward to a point having a radius of curvature of the bottom of the cylindrical wall of the second body cover, the inclined driving portion can move in an inclined direction following the radius of curvature formed by the bottom of the cylindrical wall 259. In FIG. 4, (a) illustrates a state moved to one side in the inclined direction. In FIG. 5, (a) illustrates a state moved to the other side in the inclined direction. In this state, when the operator additionally applies a pushing force, the first spring having a spring constant (modulus of elasticity) greater than the second spring undergoes elastic compression. In FIG. 4, (b) illustrates a state in which the force is additionally applied while moving to one side in the inclined direction, and in FIG. 5, (b) illustrates a state in which a force is additionally applied to the other side in the inclined direction and is further moved by r. When this additional movement is performed, the first spring elastically supporting the intermediate protrusion of the drill bit fixing portion is elastically compressed, so that the intermediate protrusion of the drill bit fixing portion moves to the lower hanging portion of the inclined moving portion. When the drill bit of the hammer drill is operated in the state that it has moved further by r, it is possible to manufacture a hole whose bottom is wider than the inlet regardless of the skill level of the operator. In one embodiment of the present disclosure, the r value is 3 mm.

At this time, the distance d between the first body and the inclined driving portion is reduced, and the intermediate protrusion of the drill bit fixing portion moves to the downward hanging portion of the inclined driving portion to form a new gap s between the intermediate protrusion of the drill bit fixing portion. The s and the d may not match, and in an embodiment of the present disclosure, d is greater than s. This is because the end of the drill bit is worn out while using the hammer drill, so that when the first body and the drill bit fixing portion are screwed together, the drill bit can be tightened so that the drill bit is exposed to a certain length.

Figure 6:
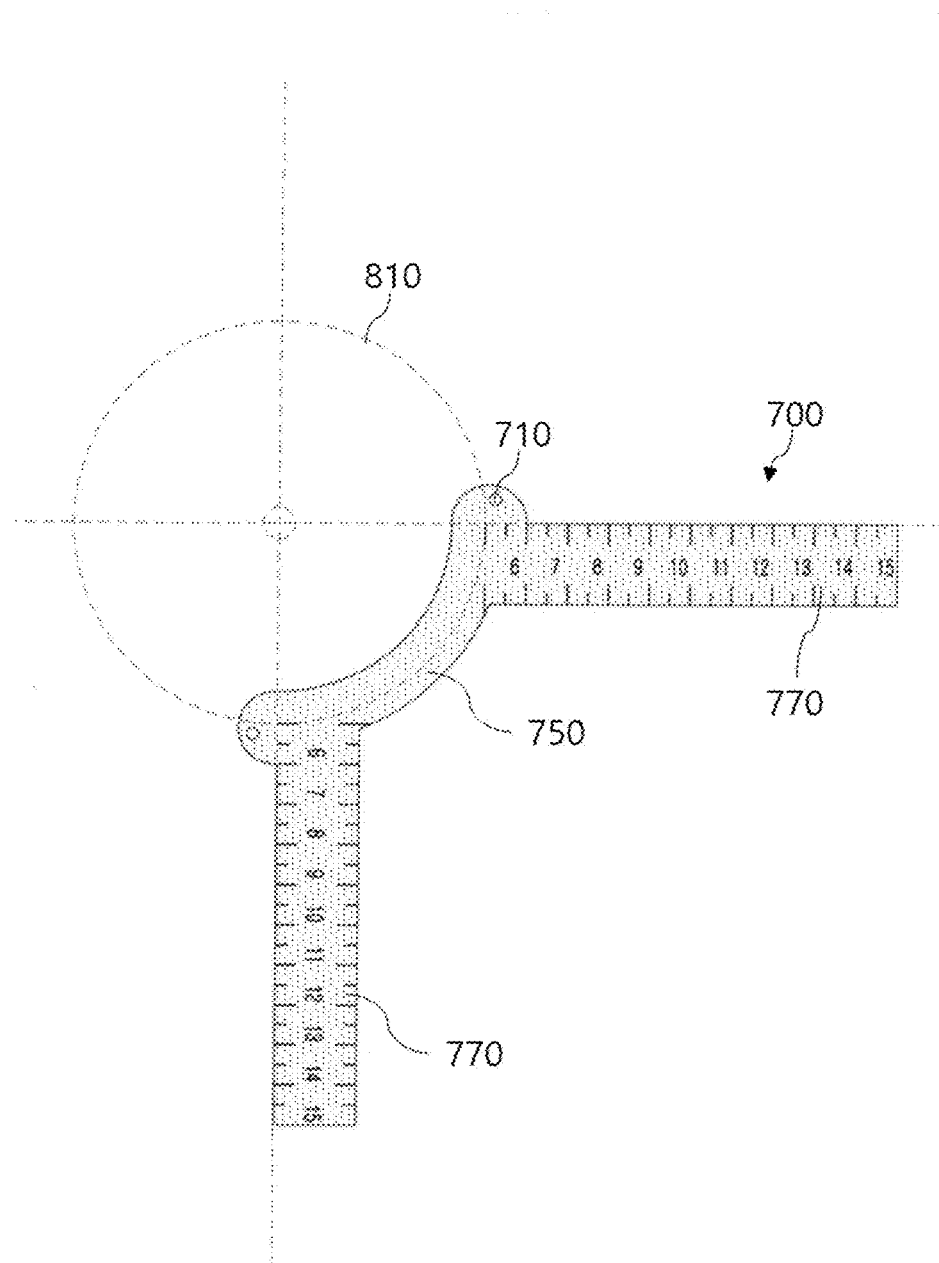
FIG. 6 is a conceptual diagram illustrating a right angle ruler connected to the outer rim of the second body cylindrical support portion of the apparatus for punching anchor bolt insertion hole to indicate the punching position, according to an embodiment of the present disclosure.

FIG. 6 is a conceptual diagram illustrating a right angle ruler 700 connected to the outer rim of the second body cylindrical support portion of the apparatus for punching anchor bolt insertion hole to indicate the punching position, according to an embodiment of the present disclosure. The right angle member includes an arc-shaped blade 750 and a spring ring 710 formed at both ends of the arc-shaped blade, and two scale marked blades 770 extending from both ends of the arc-shaped blade and perpendicular to each other. The angle of the arc is 80 degrees to 100 degrees, in one embodiment, 90 degrees. The rectangular shape is fixed to the groove of the cylindrical outer rim 810 adjacent to the bottom surface of the cylindrical support 300 by a fixing spring 800 for fixing the arc-shaped blade 750.

Figure 7:
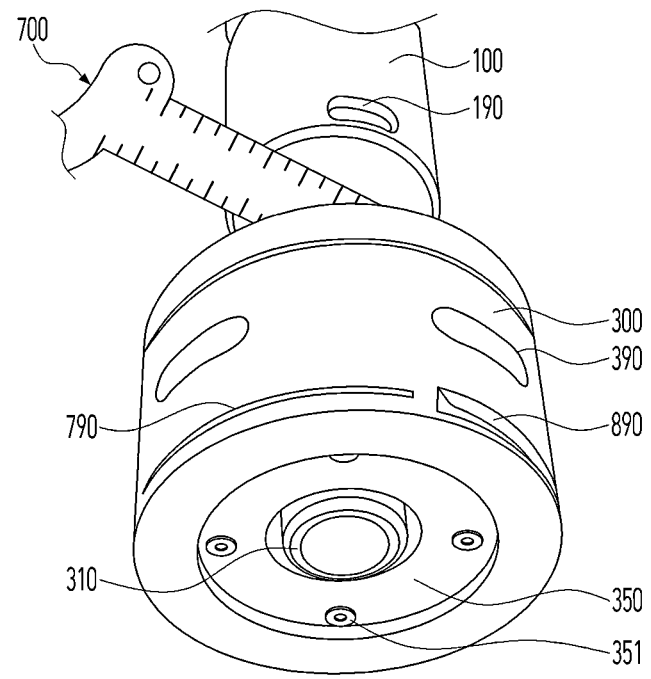
FIG. 7 is a conceptual diagram for connecting a right angle ruler to an apparatus for punching anchor bolt insertion hole, and determining a punching position using this, according to an embodiment of the present disclosure.
Figure 7:
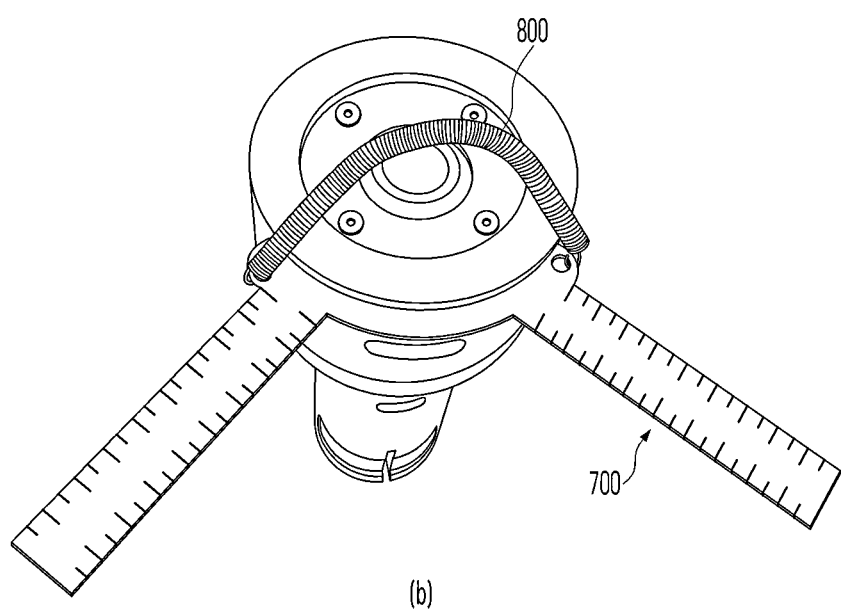

FIG. 7 is a conceptual diagram for connecting a right angle ruler to an apparatus for punching anchor bolt insertion hole, and determining a punching position using this, according to an embodiment of the present disclosure. In one embodiment of the present disclosure, the cylindrical support portion of the second body includes a groove 790 with a width into which a right angle blade may be inserted along a circular arc in a range of 80 to 100 degrees for inserting an arc of a right angle corner measurement into a cylindrical outer edge adjacent to a bottom surface, and a groove 890 having a width into which an elastic ring including a spring can be inserted in the remaining portion of the rim is formed. In FIG. 7, (a) illustrates grooves 790 and 890 formed in the cylindrical outer rim of the second body to which the rectangular ruler is fastened. In FIG. 7, (b) illustrates a state immediately before inserting a rectangular ruler into a groove into which a rectangular ruler blade can be inserted and fixing it with a fixing spring 800.

Figure 8:
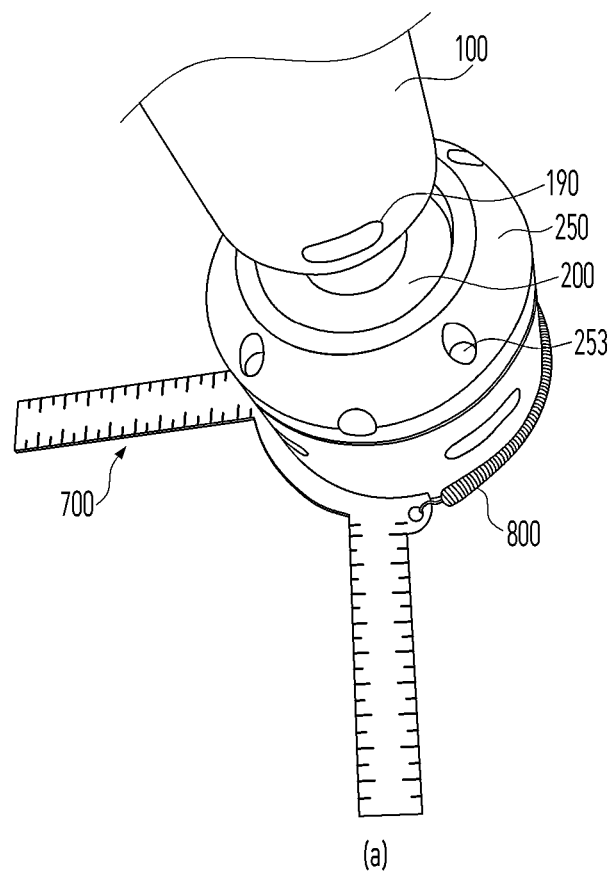
FIG. 8 is a conceptual diagram of drilling a hole at a hole position of a panel with an apparatus for punching anchor bolt insertion hole connected with a right angle, according to an embodiment of the present disclosure.
Figure 8:
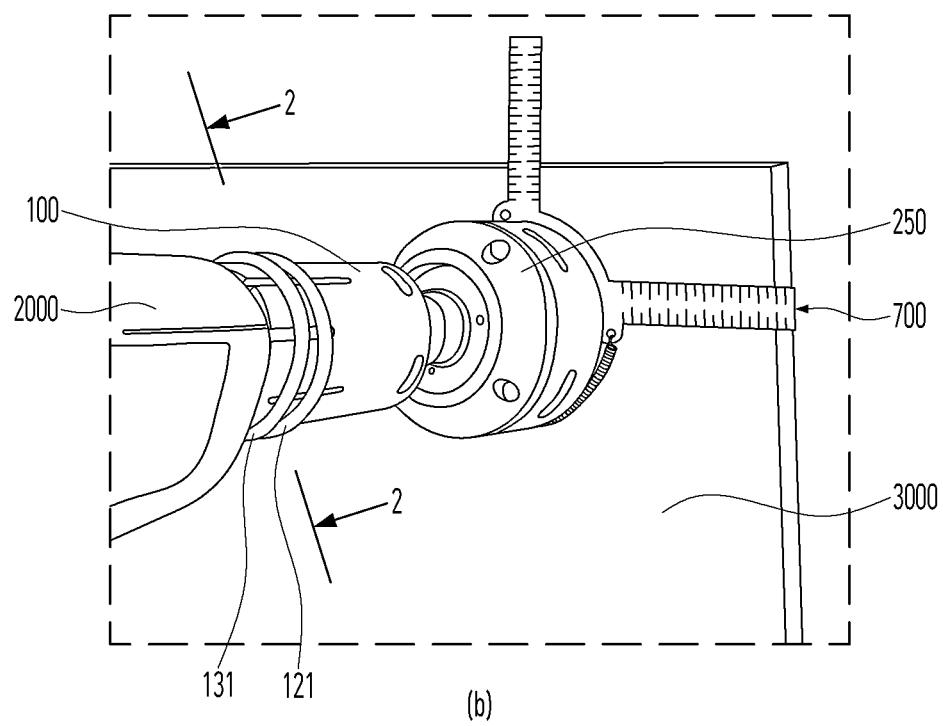

FIG. 8 is a conceptual diagram of drilling a hole at a hole position of a panel with an apparatus for punching anchor bolt insertion hole connected with a right angle, according to an embodiment of the present disclosure. In FIG. 8, (a) is a conceptual diagram for quickly setting a predetermined position from the edge of the other apparatus of the present disclosure coupled with a right angle blade. In FIG. 8, (b) is a scene in which the actual drilling by a hammer drill 2000 is performed with a drilling apparatus that connects a rectangular ruler to a predetermined point of a stone or ceramic panel 3000 for an actual building exterior. Two rubber rings 121, 131 are fixing the ring-shaped groove of first body upper cylindrical body 120, 130. By using such a rectangular ruler, not only the working time can be significantly reduced, but also the positional error can be reduced compared to the work of directly marking the position on a stone or ceramic panel.

Although embodiments of the present application have been described in detail above, the scope of the present application is not limited thereto, and various modifications and improvements by those skilled in the art using the basic concept defined in the following claims.

All technical terms used in the present disclosure, unless otherwise defined, have the meaning as commonly understood by one of ordinary skill in the art of The present disclosure. The contents of all publications herein incorporated by reference are incorporated herein by reference.

DETAILED DESCRIPTION OF MAIN ELEMENTS 100. first body
101. upper cylindrical body
102. lower cylindrical body
110. ring-shaped groove
111. female screw thread
112. inner surface of the lower cylindrical body
120, 130. ring-shaped groove of first body upper cylindrical body
121, 131. rubber ring
150. drill bit fixing portion
151. male screw thread
155. intermediate protrusion
190. outlets
200. Inclined driving portion
210. annular protrusions
220. upper surface of inclined driving portion
225. through hole
230. side surface of inclined driving portion
250. cover portion
251. fastening member
252. cylindrical support portion fastening hole
253. cover portion fastening hole
256. side inner surface
258. upper inner surface
259. cylindrical wall bottom portion
270. circular plane lower surface
275. descending hanging portion of intermediate protrusion
277. first spring
278. fastening member
300. cylindrical support portion
310. inclined driving portion support cylinder
320. inner ring-shaped support portion
325. end protrusion
330. inclined bearing
340. flat rubber ring
345. third Spring
350. lower surface assembly portion
351. fastening member
352. fastening hole
355. inclined bearing fixing portion
370. second Spring
390. outlets
400. second body
500. drill bit
550. end of drill bit
570. fixing hole
700. right angle ruler
710. spring ring
750. arc-shaped blade
770. scale marked blades
790. groove
800. fixing spring or elastic ring
810. cylindrical outer rim
890. groove
1000. hammer drill adapter
2000. hammer drill
3000. stone or ceramic panel

The invention claimed is:

1. An apparatus for punching anchor bolt insertion hole, the apparatus comprising:
a hammer drill adapter configured to be connected to a hammer drill exposing a drill bit so that the exposed drill bit passes through the hammer drill adapter and so that the drill bit is movable in a vertical direction and in an inclined direction in a predetermined space,
the hammer drill adapter comprising:
a first body comprising an upper cylindrical body and a lower cylindrical body, the upper cylindrical body being configured to be coupled to the hammer drill, the lower cylindrical body having female screw thread on an inner surface of the lower cylindrical body, a diameter of the lower cylindrical body is smaller than the upper cylindrical body;
a cylinder shaped drill bit fixing portion having a male screw thread on an upper outer surface so as to be engaged with the female screw thread of the first body, an intermediate protrusion on an outer surface of the cylinder shaped drill bit fixing portion spaced from the male screw thread by a predetermined length;
an inclined driving portion having a center and a spherical upper surface with an annular protrusion formed in the center, a vertical walled side surface with the same radius in cross section, and a detachable circular plane lower surface in contact with a bottom of the vertical walled side surface, and wherein a through hole is formed in an inner space of the inclined driving portion created by the upper surface, the side surface and the lower surface so that the intermediate protrusion of the drill bit fixing portion is located, and a first spring elastically supporting the intermediate protrusion of the drill bit fixing portion is located on an upper surface of the circular plane forming a lower surface toward the inner space, a descending hanging portion of the intermediate protrusion of the drill bit fixing portion enclosing the spring is formed in a lower height than the first spring; and
a second body comprising a cover portion comprising an upper inner surface having a radius of curvature equal to or larger than that of the spherical surface of the inclined driving portion upper surface and an opening of a predetermined size so that the spherical upper surface of the inclined driving portion is stopped, a side inner surface having a cylindrical wall so that the inclined driving portion is movable in the vertical direction, and a cylindrical wall bottom portion having been extended to a predetermined size so as to have a radius of curvature equal to or greater than the spherical upper surface of the inclined drive portion; a cylindrical supporting portion having an inclined cylindrical space coupled to the cover portion, wherein an inner ring-shaped support portion is formed inside the inclined cylindrical space, a second spring is disposed on the inner ring-shaped support portion to elastically support the inclined driving portion, and the inclined driving portion is located in the inclined cylindrical space between the cover portion and the inner ring-shaped support portion; and a lower surface assembly portion having an inclined driving portion support cylinder and an inclined bearing, the inclined driving portion support cylinder being located inside the inner ring-shaped support portion and stopping the lower surface of the inclined driving portion at a predetermined point while making the drill bit pass through the lower surface of the inclined driving portion, the inclined bearing maintaining the center of the drill bit fixing portion to the cylindrical support portion when the inclined driving portion support cylinder moves in an up and down direction and an inclined direction, wherein the spring constant of the first spring is greater than the spring constant of the second spring.

2. The apparatus for punching anchor bolt insertion hole of claim 1, wherein a flat rubber ring covering end protrusion of the inner ring-shaped support to prevent dust from entering a space between the inner ring-shaped support and the drill bit fixing portion, and a third spring applying pressure to the flat rubber ring when the lower surface of the inclined driving portion moves up and down is located in the inclined movement space of the second body.

3. The apparatus for punching anchor bolt insertion hole of claim 1, wherein the upper cylindrical portion of the first body forms a plurality of outlets for discharging dust from the cylindrical space to the outside.

4. The apparatus for punching anchor bolt insertion hole of claim 1, wherein the cylindrical support portion of the second body forms a plurality of outlets for discharging dust to the outside in the inclined movement space.

5. The apparatus for punching anchor bolt insertion hole of claim 1, wherein the cylindrical support portion of the second body having a groove along an arc in the range of 80 degrees to 100 degrees for inserting the blade of a right angle ruler for measuring a right angle to an outer cylindrical rim adjacent to the bottom surface, and having a groove width into which an elastic ring including a spring can be inserted in the remaining portion of the rim.

6. The apparatus for punching anchor bolt insertion hole of claim 1, wherein the spring constant of the first spring is greater than the spring constant of the second spring so that the first spring is not compressed while the second spring is elastically compressed.

* * * * *